Figure 1:
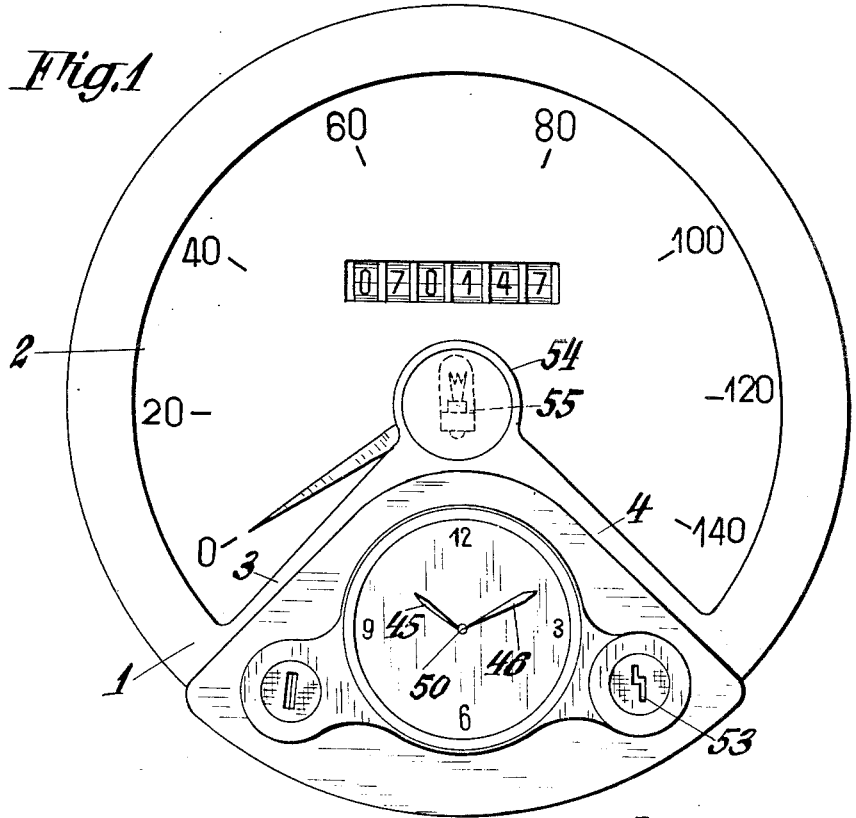

April 19, 1955

A. BAUER 2,706,671

DEVICE FOR INDICATING AND RECORDING THE DISTANCE
AND SPEED OF TRAVEL OF MOTOR VEHICLES

Filed Jan. 26, 1954

3 Sheets-Sheet 1

INVENTOR.
ALFONS BAUER
BY

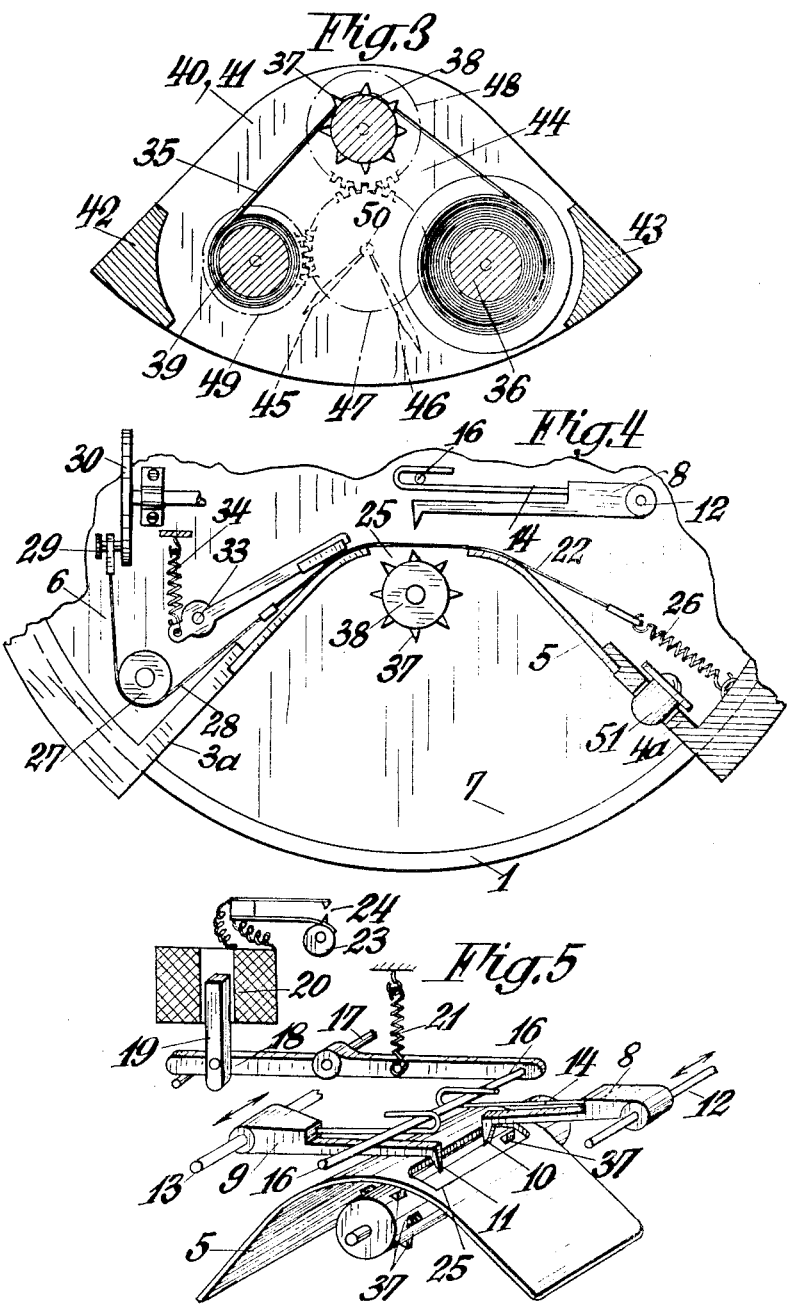

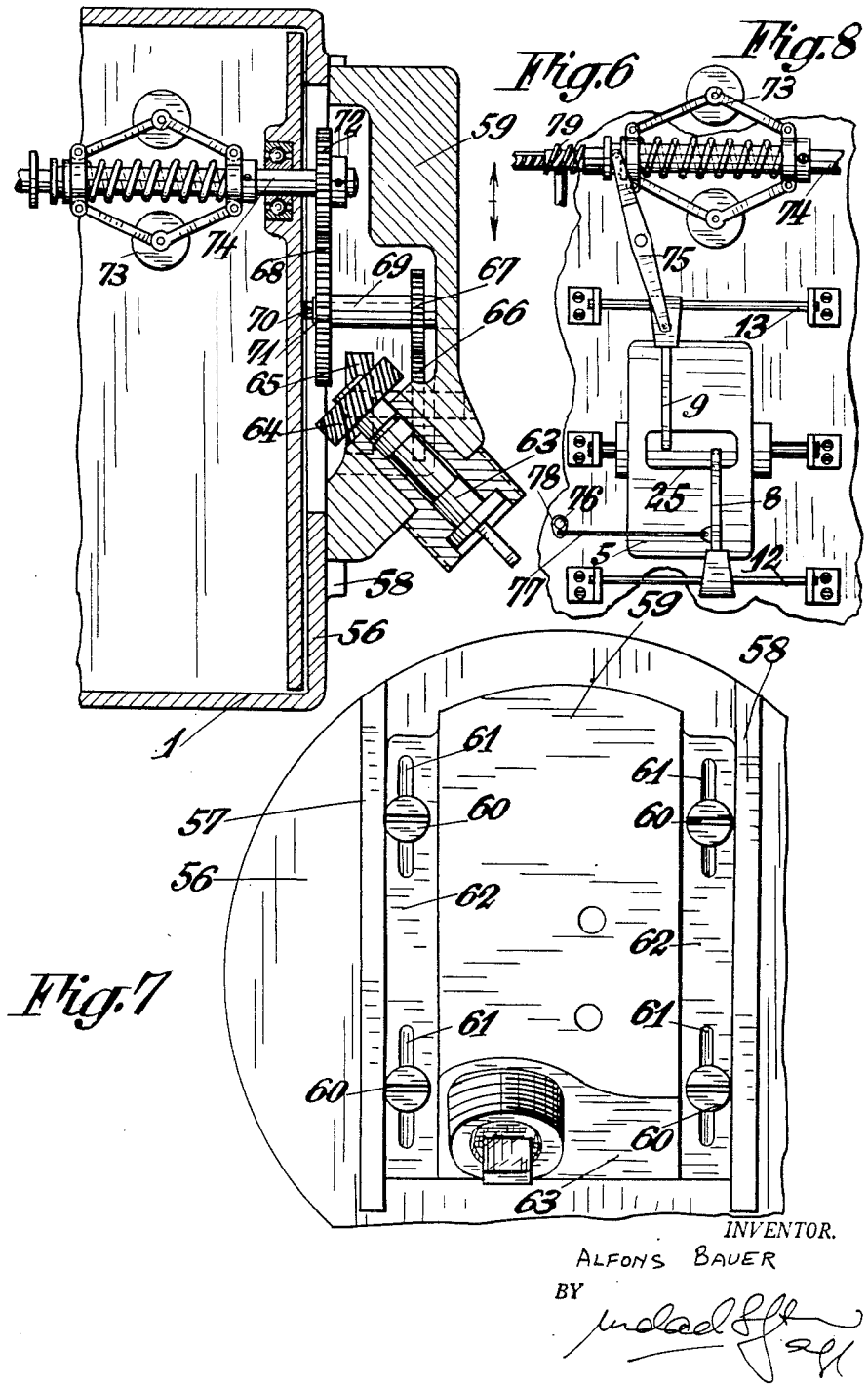

United States Patent Office 2,706,671
Patented Apr. 19, 1955

2,706,671

DEVICE FOR INDICATING AND RECORDING THE DISTANCE AND SPEED OF TRAVEL OF MOTOR VEHICLES

Alfons Bauer, Graz, Austria

Application January 26, 1954, Serial No. 406,220

Claims priority, application Austria February 12, 1953

6 Claims. (Cl. 346—50)

The invention relates to a device for indicating and recording the distance and speed of travel of motor vehicles, in which the record carrier can be moved forward by a clockwork at regular speed and two recording levers are provided, one of which can be controlled by a centrifugal pendulum coupled with the drive or road wheel of the vehicle, for recording the speed of travel, whereas the other one can be controlled by an odometer for recording the distance travelled.

In most of the previously known devices of that type paper discs or strips are used whose surface is provided with a wax layer, which is scratched by the recording levers in the form of traces indicating the speed and distance travelled.

Devices with obliterable records are known, which can record, however, only short distances of travel. Such devices are not suitable for general use.

The known devices mentioned first have various disadvantages, which will be referred to hereinafter. For instance, the condensed graph in the shape of a sector of a circle on the wax discs can be read only with difficulty by laymen and even by an expert because the accuracy of reading suffers from the closely arranged scratches and it is hardly possible to read from the scratch traces changes of speed succeeding quickly in short periods of time, e. g. within a period of two minutes, because in that case only a wide scratch trace is produced which covers a more or less extended speed range. Thus these scratch traces lack the force of evidence just in the decisive moment.

To remove this disadvantage it has been attempted to use wax strips instead of discs. They involved substantial obstruction of the clockwork because the same had to produce not only the force for overcoming the resistance to recording but also for winding the strip.

It is also known that the wax-coated record carriers can be forged easily and that they have the disadvantage that the wax scraped off causes a heavy soiling of the mechanism. In addition, the manufacture of such wax-coated discs or strips is very difficult and expensive because the imprint causes great difficulty.

A further essential disadvantage of these known devices for speed recording resides in the fact that they have a front cover which must be swung open, as in pocket watches, when the record carrier is to be replaced. Most types of vehicles lack sufficient space for that hinged cover on the dashboard. For this reason the known recording devices have been fixed in most types of vehicles beside or below the dashboard, where they are outside of the range of the steering column obstructing the outward swing of the cover and outside of the direct range of view of the driver.

According to the invention the disadvantages of the known recording devices are avoided entirely by the fact that the record carrier consists of a recording strip, e. g. a film of paper, which is provided with at least one row of holes and is passed over a sprocket driven by a clockwork, and a winding reel and unwinding reel respectively arranged on both sides of the sprocket, and which is incorporated independently of the recording levers but together with the winding and unwinding reels and the sprocket in a casing block carrying the clockwise and the pointer means and easily removably inserted as a unit in a free space provided in the casing of the recording device.

In this connection the arrangement is preferably such that, in an embodiment of the invention, the casing of the recording device is divided by a partition wall having a window opening into a casing space covered at the front by a dial including an angle of about 240 deg., and a second casing space, which is open in front and extends over an angle of about 120 deg., and the casing block containing the paper film, the winding and unwinding reels and the sprocket, and carrying the clockwork and the pointer means, can be inserted from the front into the latter casing space and can be fixed therein.

Thereby it is achieved in the first place that the record carrier need no longer be replaced at the location of the vehicle, as previously, but can be replaced independently of the vehicle, and in the second place that the device can be accommodated everywhere on the dashboard and can be incorporated more particularly on the dashboard instead of the tachometer, the disturbing hinged cover being eliminated.

An essential progress concerning the clarity of the record is achieved thereby that for making dot records the recording levers with the nibs can be moved jointly against the paper strip in intervals for a short while by a mechanical or electromagnetic control device, the intervals of time between the successive dots being determined by the odometer in dependence on the speed of travel. The dotwise recording of the speed and distance of travel has the advantage of least resistance to movement and maximum accuracy of recording. For this reason relatively long paper films may be used as record carriers.

In a further development of the invention the quick setting of the device to the distance-revolution factor of a vehicle is made possible by arranging the change gears in such a manner that one gear of the change gearing is fixed in a stationary location on the shaft extending out of the rear wall of the casing, whereas another gear or the other gears of the change gearing are incorporated and journalled in the attachable casing block, with which they are attachable to the rear wall of the casing of the device, and for coupling the attachable gearing part with the stationary gear are slidable and can be locked in position on the rear wall of the casing.

This enables the individual or joint exchange of the change gears when the casing block is removed and, for this purpose, the setting of their centers closer together or wider apart and the fixation of their centers in the respective meshing position. With that attached block the adaptability of the change gearing to the distance-revolution factor of the different motor vehicles is increased to a maximum not achieved so far.

The accompanying drawings show diagrammatically an illustrative embodiment of a device for recording the speed and distance of travel, constructed according to the invention.

Figure 2:
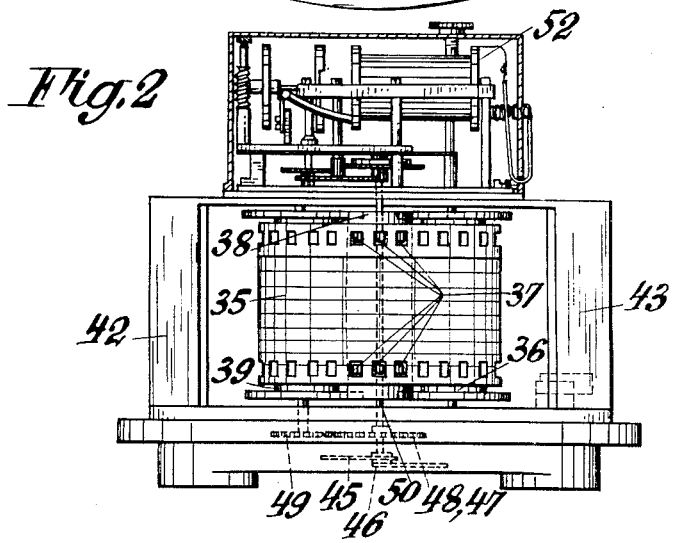

Fig. 1 is a front view of the device,
Fig. 2 is a top plan view of the insertable casing block,
Fig. 3 is a cross-sectional view of the casing block, the winding reel and the sprocket,
Figs. 4 and 5, respectively, illustrate the recording mechanism with the ink-ribbon layout, in an elevation with the casing in section, and in a perspective view,
Fig. 6 is a vertical sectional view of an attachable casing block and a part of the casing of the speed recording device,
Fig. 7 is a rear view of the device, and
Fig. 8 shows diagrammatically the connection of the centrifugal pendulum and of the counter to the recording levers.

In a manner known the speed indicator is provided with a dial 2 built at the front end into the substantially hollow-cylindrical casing 1 and marked with graduations, e. g. from "0" to 140 kilometers in an angular range of about 240 deg. That angular range of the dial 2 is delimited by two ribs 3, 4, which extend from the shell of the casing radially towards the dial center and are continued at the rear by two short wall sections 3a, 4a directed radially towards the dial center and connected by an arcuate partition 5, which subdivides the indicator casing 1 into two spaces 6 and 7, the lower one of which includes an angle of about 120 deg. and occupies the full casing depth. The casing space 6 accommodates a centrifugal pendulum 73 fastened on the shaft 74. The casing incorporates further an odometer (revolution counter) of known type, which is driven from shaft 74 through a worm gearing 79. In addition, the elements of the recording unit are mounted in the casing. That recording unit comprises two recording levers 8 and 9, which are associated respectively with the two recording fields and which with their nib ends 10, 11 are arranged closely together whereas the levers extend in mutually opposite directions and are mounted independently of each other on stationary guide rods 12, 13, respectively, on which the respective lever is slidable parallel to itself and pivotally movable. The recording lever designated 9 is moved parallel to itself on rod 13 by a known centrifugal pendulum 73 and its two-armed connection lever 75 (Fig. 8) in dependence on the rising and dropping speed of travel. The other recording lever, designated 8, is connected in a manner known to the worm gearing 76 of an odometer and is reciprocated by the same, e. g. through a crank drive, on the rod 8 in its striplike recording field about 5 mm. wide, for recording a distance of e. g., one mile. Thus a zig-zag line is recorded, which has an upward or downward stroke for every half mile. Each of the two recording levers 8, 9 has a resilient hook 14 or 15, respectively, which extends parallel to the lever arm. Both hooks 14, 15 are passed through by a control rod 16, which is arranged transversely of the recording levers 8, 9 and by means of a lever 18, pivotally movable on the stationary pin 17, is moved up and down parallel to itself against the action of a spring 21 by the armature 19 of an electromagnet 20 to move the nibs 10, 11 of recording levers 8, 9 against an ink-ribbon 22 and a paper strip, to be described hereinafter, to produce a dot record. The electromagnet 20 being energized for short periods following in rapid succession by a current contact 24 controlled by a cam 23 of the revolution counter, the two nibs 10, 11 of the two recording levers 8, 9 are moved always simultaneously for short periods against the ink-ribbon and the paper strip. To this end the partition 5 has a window 25, through which the nibs 10, 11 of the two recording levers 8, 9 extend. The ink ribbon 22, which in its width exceeds the range of movement of the two nibs 10, 11, is stretched over the window 25 of the curved partition 5. At one end the ink-ribbon 22 is stretched taut by a spring 26 and at its other end it is connected by the intermediary of a tension member 28 passed around a roller 27 connected to the crankpin 29 of a crank disc 30, which is driven through a reducer by the worm gearing of the revolution counter. That crank disc 30 reciprocates the ink-ribbon 22 against the tension of spring 26 slowly over the curved partition 5 and over an ink pad 31 so that the nibs 10, 11 always impinge freshly inked portions of the ribbon. The ink pad 31 is attached to a one-armed lever 32, which is pivotally movable about the stationary pin 33 and engages the ink-ribbon under the action of a spring 34 engaging the lever 32 and the casing 1 and urges the ink-ribbon 22 slightly against the curved part of the partition 5. Since the braking effect of the ink pad 31 is only slow, it cannot have any appreciable influence on the movement of the ink-ribbon.

The recording device employs a recording strip 35 provided with a grid and having a longitudinal row of holes as a rack. The strip may consist of a perforated paper film wound on a winding roll 36 and moved from the same over a sprocket 38 formed with teeth 37 to a second winding roll 39, on which the recording strip 35 is wound in the same sense of rotation. The two winding rolls 36 and 39 and the sprocket 38 are rotatably mounted in a casing block which can be slidingly inserted from the front into the space 7 of casing 1 of the speed indicator. That casing block comprises two parallel walls 40, 41 and two webs 42, 43 connecting the walls. The hollow front wall 40 of the casing block accommodates pointer means and the rear wall 41 has attached thereto a clockwork or timing mechanism, whose time spindle 50 extends through the two walls 40, 41 and the space 44 between them for the winding reels 36, 39 and the sprocket 38. The pointer spindle 50 moves forward not only the two pointers 45, 46 in a manner known but through three gears 47, 48, 49 journalled in a cavity of the front wall 40 also drives the sprocket 38 and the winding reel 39. That sprocket 38 engages with its teeth 37 the holes of the perforation of the paper film 35 held down by the partition 5 against the periphery of the sprocket and moves the film from one winding reel 36 to the other one, 39, past the window 25 of partition 5, at a speed prescribed by the clockwork 52. The winding rolls 36, 39 are arranged in the casing block 40—43 to form a triangle with the sprocket 38, which is arranged in the middle between but above the two winding rolls 36, 39. Owing to this arrangement the paper film 35, fixed with each of its ends on one winding roll, rests on the periphery of the sprocket 38 owing to the tension imparted to the film as it is wound. Thus the film is perfectly carried along by the sprocket teeth 37 engaging with the perforation of the paper strip.

The sprocket 38 lies just below the window 25 and with its peripheral surface forms the backing for the recording action of the two nibs 10, 11 of the recording levers 8, 9.

Since the interrupter contact 24 for the electromagnet 20 is driven by the cam 23 of the worm gearing 76 associated with the known revolution counter, the number of ink dots produced by the nibs 10, 11 on the paper film 35 depends on the number of revolutions of the worm gearing. This means that when the worm gearing is running at low speed, the electromagnet 20 will receive few current impulses and by means of the nibs 10, 11 will produce few ink dots on a certain length of the paper film, moved forward at regular speed. When the worm gearing of the revolution counter and with it the control cam 23 is running at high speed the electromagnet 20 will be fed with much more current impulses and will produce with the aid of the nibs 10, 11 much more ink dots on the same length of the paper film. For this reason the spacing of the several ink dots on the paper strip permits of a conclusion concerning the accelerating and breaking power of a vehicle.

It may be mentioned here that the dotwise recording by means of the nibs 10, 11 can be achieved not only by electromagnetic means but also by mechanical means, e. g. by a resilient stop actuated by the worm gearing of the revolution counter. It is also possible to actuate one of the two recording levers 8, 9, preferably that used for recording the distance of travel, by direct engagement with the known mechanism for stepping forward the counter rolls, since only a small force is required for actuating the recording levers.

The oscillating movements of the two recording levers 8, 9 produced under the influence of the electromagnet 20 substantially reduce the bearing friction of said levers on the guide rods 12, 13 as regards their free guidance under the influence of the revolution counter or the centrifugal pendulum of the speed indicator. For this reason a relatively small force is required for displacing the recording levers 8, 9 axially on the guide rods 12, 13. As a result, the weight of the pendulum, e. g. a centrifugal pendulum, may be much smaller than with the known speed recording indicators.

For driving the recording device the displacing force of a known eddy current system is sufficient. In such case both recording levers 8, 9, particularly the one used for speed recording, are adjustable by the displacing force of a centrifugal pendulum or an eddy current system by means of a rack and pinion or preferably by a tension element consisting of a silk thread.

As described hereinbefore, the entire casing block 40—43 containing a part of the recording device, together with the clockwork 50 can be inserted from the front into the casing 1. For locating the casing block 40—43 in casing 1 the same is provided with a resilient locking bolt 51, which under spring force jumps automatically into a rest of the casing block when the casing block is firmly and completely fitted in the casing opening. The casing block incorporates a hair-trigger lock 53 for a hair-trigger key, with which the lock can be released.

As shown in Fig. 2, the paper film 35 has a grid which divides the paper strip into two component strips. The narrower one of said strips is about 5 mm. wide and serves for recording the distance covered in the period of travel, as has been mentioned already. The wider strip is intended for recording the speeds of travel. When the paper film has in its longitudinal direction graduations coinciding with its speed, the result can be read from the paper film easily when the casing block 40—43 has been removed. In this manner the distance and speeds of travel can be found immediately.

When the casing block 40—43 has been removed, any examination of the record is possible independently of the location of the speed indicator, and the paper film can be replaced conveniently.

In the middle of the front side of the casing 1 a head 54 carried by two ribs 3, 4 may be provided for a transparent cover cap, behind which an illuminating and signal lamp 55 is arranged.

The casing 1 of the speed recording unit has arranged on its outside at the rear wall 56 two guide strips 57 and 58, between which an attachable casing block 59 is slidably inserted, which can be fixed, e. g., with four screws 60 to the rear wall 56 of the casing. These screws 60 extend through slots 61 of the flanges 62 of the block so that the casing block 59 can be displaced to the extent of the length of the slots when the screws 60 have been loosened. That casing block 59 contains the gear transmission which transmits the revolutions of the gear shaft (not shown) of the vehicle to the recording unit with the ratio of the respective distance-revolution factor. The transmission comprises the gear shaft 63 connectable to the flexible shaft (not shown), a helical gear 64 fast on said gear shaft 63 and engaging at an acute angle a second helical gear 65, which through a gear train 66, 67 drives a floating change gear 68. That change gear 68 is rigidly connected through a sleeve 69 with the gear 67 and together with it is rotatably mounted on the pin 70, on which it is locked against axial displacement by a split-pin 71. When the casing block 59 is attached, that change gear 68 is in mesh with a second change gear 72, which is readily detachably fixed for joint rotation by means of a split-pin on the shaft 74 carrying the centrifugal pendulum 73.

The drawing shows that the casing block 59 can be readily removed from the casing 1, 56 of the recording device and that when the change gearing is exposed the change gears 68 and 72 can be replaced easily. Since every replacement of the change gears 68, 72 will also change their center distance, the pin 70 and the shaft 74 are arranged in a plane which is parallel to the guides 57, 58 of the casing block 59 so that upon displacement of the casing block 59 in the guides 57, 58 the pin 70 is moved closer to or farther away from the shaft 74, as may be required for the toothed mesh of the two change gears 68, 72. Obviously that adjustment of the wheel centers substantially increases the adaptability of the change gearing and of the recording device to different distance-revolution factors of the vehicles and it is possible for the first time to cover with one gearing block all possible variations of the numbers of gear teeth. With the previously known adapters this was not possible owing to the unchangeable location of the gear shafts. With a sufficiently large set of gears all possible variations may be utilized.

It may be mentioned that the casing block 59 with the gears can be built directly into the casing 1, 56 of the recording device for easy removal.

I claim:

1. In a device for indicating and recording the distance and speed of travel of motor vehicles, a drum-shaped casing formed with a compartment having the cross section of a sector of a circle and extending throughout the depth of the casing, a casing block insertable from the front into the casing compartment, a disc covering the front of the casing and having a mileage dial leaving free said sector, a shaft journalled in the casing and connectable by a rotary connecting element to a road wheel of the vehicle for rotation thereby, a centrifugal pendulum arranged on the shaft, an odometer mounted in said casing and arranged to be driven by said shaft, two recording levers mutually independently mounted in said casing, one of said recording levers being operatively connected to the centrifugal pendulum for recording the speed of travel, the other of said recording levers being operatively connected to said odometer for recording the distance travelled, a winding and unwinding unit mounted in said casing block, a record strip inserted in said winding and unwinding unit and held by the same in position for recording adjacent to the recording levers, an ink-ribbon disposed between said recording levers and said record strip, means for moving said ink-ribbon, a clockwork connected with the casing block to form an insertable unit therewith, means for independently driving said clockwork, said clockwork being operatively connected to the winding and unwinding unit for moving said record strip at regular speed, pointer means arranged at the front of the casing block and in driven relation to the clockwork, said pointer means, lying substantially in a plane with said covering disc when the casing block has been inserted into the casing.

2. In a device for indicating and recording the distance and speed of travel of motor vehicles, a drum-shaped casing formed with a compartment having the cross section of a sector of a circle and extending throughout the depth of the casing, a casing block insertable from the front into the casing compartment and formed with a rear wall, a disc covering the front of the casing and having a mileage dial leaving free said sector, a shaft journalled in the casing and connectable by a rotary connecting element to a road wheel of the vehicle for rotation thereby, a centrifugal pendulum arranged on the shaft, an odometer mounted in said casing and arranged to be driven by said shaft, two recording levers mutually independently mounted in said casing, one of said recording levers being operatively connected to the centrifugal pendulum for recording the speed of travel, the other of said recording levers being operatively connected to said odometer for recording the distance travelled, a winding and unwinding unit mounted in said casing block, a record strip inserted in said winding and unwinding unit and held by the same in position for recording adjacent to the recording levers, an ink-ribbon disposed between said recording levers and said record strip, means for moving said ink-ribbon, a clockwork attached to the rear wall of said casing block to form an insertable unit with said block, means for independently driving said clockwork, a gear train mounted in said casing block for connecting said clockwork with the winding and unwinding unit for transmitting rotation to the latter and for moving the record strip at regular speed, said clockwork comprising a pointer shaft extending through the casing block adjacent to said winding and unwinding device, pointer means arranged at the front end of said casing block in driven relation to said pointer shaft, said pointer means lying substantially in a plane with said covering disc when the casing block has been inserted into the casing.

3. In a device for indicating and recording the distance and speed of travel of motor vehicles, a drum-shaped casing formed with a compartment having the cross section of a sector of a circle and extending throughout the depth of the casing, a casing block insertable from the front into the casing compartment, a disc covering the front of the casing and having a mileage dial leaving free said sector, a shaft journalled in the casing and connectable by a rotary connecting element to a road wheel of the vehicle for rotation thereby, a centrifugal pendulum arranged on the shaft, an odometer mounted in said casing and arranged to be driven by said shaft, two recording levers mutually independently mounted in said casing, one of said recording levers being operatively connected to the centrifugal pendulum for recording the speed of travel, the other of said recording levers being operatively connected to said odometer for recording the distance travelled, an electromagnetic control device adapted to transmit to the recording levers motive impulses in intervals of time for dotwise recording, a winding and unwinding unit mounted in said casing block, a record strip inserted in said winding and unwinding unit and held by the same in position for recording adjacent to the recording levers, an ink-ribbon disposed between said recording levers and said record strip, means for moving said ink-ribbon, a clockwork connected with the casing block to form an insertable unit therewith, means for independently driving said clockwork, said clockwork being operatively connected to the winding and unwinding unit for moving said record strip at regular speed, pointer means arranged at the front of the casing block and in driven relation to the clockwork, said pointer means lying substantially in a plane with said covering disc when the casing block has been inserted into the casing.

4. In a device for indicating and recording the distance and speed of travel of motor vehicles, a drum-shaped casing formed with a compartment having the cross section of a sector of a circle and extending throughout the depth of the casing, a casing block insertable from the front into the casing compartment, a disc covering the front of the casing and having a mileage dial leaving free said sector, a shaft journalled in the casing and connectable by a rotary connecting element to a rear wheel of the vehicle for rotation thereby, a centrifugal pendulum arranged on the shaft, an odometer mounted in said casing and arranged to be driven by said shaft, two recording levers mutually independently mounted in said casing, one of said recording levers being operatively connected to the centrifugal pendulum for recording the speed of travel, the other of said recording levers being operatively connected to said odometer for recording the distance travelled, a mechanical control device adapted to transmit to the recording levers motive impulses in intervals of time for dotwise recording, a winding and unwinding unit mounted in said casing block, a record strip inserted in said winding and unwinding unit and held by the same in position for recording adjacent to the recording levers, an ink-ribbon disposed between said recording levers and said record strip, means for moving said ink-ribbon, a clockwork connected with the casing block to form an insertable unit therewith, means for independently driving said clockwork, said clockwork being operatively connected to the winding and unwinding unit for moving said record strip at regular speed, pointer means arranged at the front of the casing block and in driven relation to the clockwork, said pointer means lying substantially in a plane with said covering disc when said casing block has been inserted into the casing.

5. In a device for indicating and recording the distance and speed of travel of motor vehicles, a drum-shaped casing comprising a curved partition formed with a window and defining a compartment having the cross-section of a sector of a circle, a casing block insertable from the front into the casing compartment, a disc covering the front of the casing and having a mileage dial leaving free said sector, a shaft journalled in the casing and connectable by a rotary connecting element to a road wheel of the vehicle for rotation thereby, a centrifugal pendulum arranged on said shaft, an odometer mounted in said casing and arranged to be driven by said shaft, a winding roll and an unwinding roll mounted in said casing block, a sprocket rotatably mounted below said window between said two rolls in a triangular configuration, a perforated record strip extending from one of said rolls to the other over said sprocket, two recording levers mutually independently mounted in said casing and movable through said window onto said record strip, one of said recording levers being operatively connected to the centrifugal pendulum for recording the speed of travel, the other of said recording levers being operatively connected to said odometer for recording the distance travelled, an ink-ribbon disposed between said recording levers and said record strip, said ink-ribbon covering said window and engaging said curved partition adjacent to said window, means for moving said ink-ribbon, a clockwork connected with the casing block to form an insertable unit therewith, means for independently driving said clockwork, said clockwork being operatively connected to said sprocket for moving said record strip at regular speed, pointer means arranged at the front of the casing block and in driven relation to the clockwork, said pointer means lying substantially in a plane with said covering disc when the casing block has been inserted into the casing.

6. In a device for indicating and recording the distance and speed of travel of motor vehicles, a drum-shaped casing having a rear wall and formed with a compartment having the cross section of a sector of a circle and extending throughout the depth of the casing, a casing block insertable from the front into the casing compartment, a disc covering the front of the casing and having a mileage dial leaving free said sector, a shaft journalled in the casing, a gear fixed on said shaft outside of said casing, a change gear in mesh with said gear, a rear casing block replaceably carrying said change gear, the axes of said gear and change gear extending in a common plane, guide means arranged on the rear wall of said casing and expanding in the direction of said common plane, said rear block being slidably arranged in said guide means for movement in the direction of said common plane, means for locking said rear casing block in position relative to said guide means, a rotary connecting element connectable to a road wheel of the vehicle for rotation therewith, a gear train operatively connecting said rotary connecting element to said change gear, an odometer mounted in said casing and arranged to be driven by said shaft, two recording levers mutually independently mounted in said casing, one of said recording levers being operatively connected to the centrifugal pendulum for recording the speed of travel, the other of said recording levers being operatively connected to said odometer for recording the distance travelled, a winding and unwinding unit mounted in said casing block, a record strip inserted in said winding and unwinding unit and held by the same in position for recording adjacent to the recording levers, an ink-ribbon disposed between said recording levers and said record strip, means for moving said ink-ribbon, a clockwork connected with the insertable casing block to form an insertable unit therewith, means for independently driving said clockwork, said clockwork being operatively connected to the winding and unwinding unit for moving said record strip at regular speed, pointer means arranged at the front of the insertable casing block and in driven relation to the clockwork, said pointer means lying substantially in a plane with said covering disc when the insertable casing block has been inserted into the casing.

References Cited in the file of this patent

UNITED STATES PATENTS

| | | |
|---|---|---|
| 1,503,078 | Wallbillich | July 29, 1924 |
| 1,516,808 | Duncan | Nov. 25, 1924 |
| 1,723,228 | Brunham | Aug. 6, 1929 |